(No Model.)
J. DOUGLASS.
GUARD AND TRACE ATTACHMENT FOR HARNESS HAMES.
No. 339,629. Patented Apr. 13, 1886.
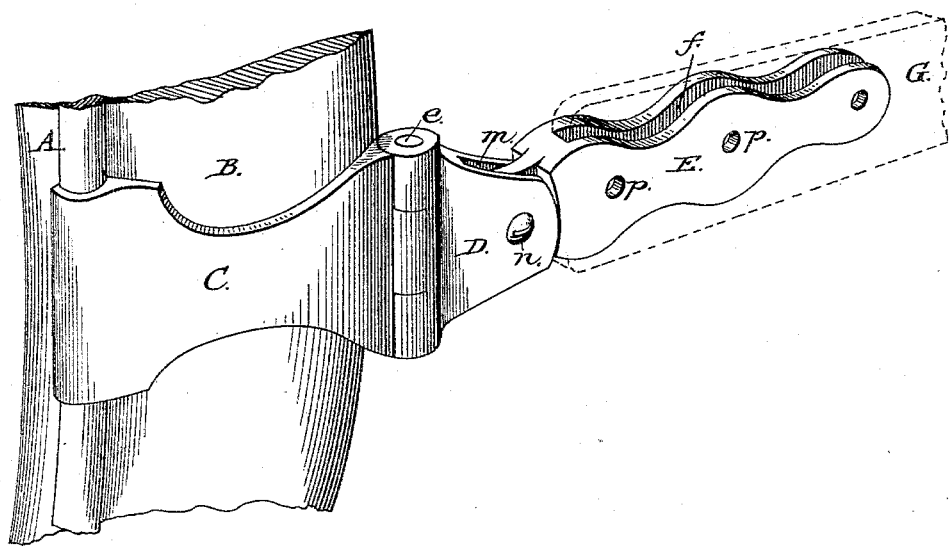
Attest:
John A. Ellis
A. B. Moore
Inventor:
John Douglass
By David A. Burr
Atty.

United States Patent Office.

JOHN DOUGLASS, OF BROOKLYN, NEW YORK.

GUARD AND TRACE ATTACHMENT FOR HARNESS-HAMES.

SPECIFICATION forming part of Letters Patent No. 339,629, dated April 13, 1886.

Application filed August 24, 1885. Serial No. 175,160. (No model.)

*To all whom it may concern:*

Be it known that I, JOHN DOUGLASS, of the city of Brooklyn, in the county of Kings and State of New York, have invented a new and useful Improvement in a Guard and Trace Attachment for Harness-Hames; and I do hereby declare that the following is a full and exact description thereof, reference being had to the accompanying drawing, and to the letters of reference marked thereon, making a part of this specification.

My invention relates to the attachment of the traces to the hames in a harness.

Its object is to prevent the collar from being worn out by the trace or trace-hook, and at the same time prevent, also, the displacement or movement of the collar and the consequent chafing of the animal by the draft.

A in the accompanying drawing represents a hame of any approved pattern, adapted to be fitted to the collar B in the well-known manner. To this hame A is firmly secured a guard-plate, C, made to extend therefrom at about a right angle with its length, and which is curved and fashioned to fit neatly upon and to extend slightly beyond the roll of the collar.

D is a hinge-block hinged to the end of the guard-plate upon a hinge-pin, e, as shown in the drawing, which permits the block to turn freely transversely to the length of the guard-plate. The outer end of this hinge-block is slotted at m to receive the end of a tongue projecting from the end of a trace-plate, E, which is hinged to the block by means of a transverse pivot, n, passing through the jaws of the slot and the end or tongue of the plate, so as to permit its vibration in a plane parallel with that of the guard-plate C and length of the hame, and at right angles to the line of vibration of the hinge-block D upon said guard-plate.

The trace-plate E may be slotted longitudinally, as at f, to receive and embrace the end of the trace G, (see dotted lines,) which is secured therein by transverse rivets inserted through holes p p in the plate; or the trace may be otherwise made fast thereto in any well-known manner.

The guard-plate c, covering the roll or after-wale of the collar and fitting snugly and neatly, as well as immovably, thereon, not only protects it fully against all wear or abrasion from the trace-connection, but permits this connection to be made at the rear of the collar, so as to cause the draft thereon to work with greater ease and comfort to the animal than in any attachment heretofore employed, while the double hinge-joint prevents any indirect strain upon the hame or collar, and permits the trace to adjust itself automatically to a direct line of draft under all circumstances without moving the collar.

I am aware that a guard-plate secured to the hame has been interposed between the collar and a hook and staple or other device for attaching the trace to the hame, so as to prevent the device from wearing out the collar, and also that a single hinged connection has been formed between the hame and trace, to allow the latter to swing in one direction; but my invention differs from others in that the attachment of the trace to the hame is made away from and at the rear of the collar, instead of upon it, and by means of a double joint which permits its automatic adjustment in both a horizontal and a vertical plane with reference to the fixed guard-plate stationary upon the collar.

I claim as my invention—

The combination, with a fixed guard-plate, C, secured to a hame to extend therefrom beyond the edge of the collar, of the hinge-block D, hinged to said guard-plate to swing upon an axis parallel with the length of the hame, and the trace-plate E, pivoted to the hinge-block to swing upon an axis at a right angle to that of the first hinge, substantially in the manner and for the purpose herein set forth.

In testimony whereof I have signed my name to this specification in the presence of two subscribing witnesses.

JOHN DOUGLASS.

Witnesses:
 HENRY JONES,
 FRANK JONES.